(12) United States Patent
Maier et al.

(10) Patent No.: US 6,202,593 B1
(45) Date of Patent: Mar. 20, 2001

(54) TEAT RUBBER CUP

(75) Inventors: Jakob Maier, Tuerkheim (DE); Tilman Hoefelmayr, Niederteufen (CH); Kathrin Lincke, Tuerkheim (DE)

(73) Assignee: Siliconform GmbH & Co. KG, Tuerkheim (DE)

( * ) Notice: Subject to any disclaimer, the term of this patent is extended or adjusted under 35 U.S.C. 154(b) by 0 days.

(21) Appl. No.: 09/254,255

(22) PCT Filed: Aug. 21, 1997

(86) PCT No.: PCT/EP97/04562

§ 371 Date: May 28, 1999

§ 102(e) Date: May 28, 1999

(87) PCT Pub. No.: WO98/09506

PCT Pub. Date: Mar. 12, 1998

(30) Foreign Application Priority Data

Sep. 3, 1996 (DE) .............................................. 196 35 719

(51) Int. Cl.[7] ....................................................... A01J 5/04
(52) U.S. Cl. ...................................... 119/14.47; 119/14.48
(58) Field of Search ............................. 119/14.36, 14.47, 119/14.31, 14.49, 14.5, 14.51, 14.48, 14.52, 14.53

(56) References Cited

U.S. PATENT DOCUMENTS

| | | |
|---|---|---|
| 2,744,496 | 5/1956 | Roeben . |
| 4,141,319 | 2/1979 | Maier et al. . |
| 4,320,718 | 3/1982 | Hoefelmayr et al. . |
| 5,317,988 | 6/1994 | Hoefelmayr et al. . |
| 5,857,424 | * 1/1999 | Johnston ............................ 119/14.47 |

FOREIGN PATENT DOCUMENTS

| | | |
|---|---|---|
| 25 18 897 | 11/1976 | (DE) . |
| 2551931 | * 6/1977 | (DE) . |
| 29 41 150 | 11/1980 | (DE) . |
| 0 477 950 A1 | 4/1992 | (EP) . |

* cited by examiner

Primary Examiner—Peter M. Poon
Assistant Examiner—Yvonne R. Abbott
(74) Attorney, Agent, or Firm—Flynn, Thiel, Boutell & Tanis, P. C.

(57) ABSTRACT

A teat rubber cup comprising a head member substantially rotationally symmetric with a longitudinal axis, with an aperture for insertion of the teat, a retaining edge to engage over a teat cup sleeve, and a suction stub joined to the head member, the end of the head member opposite the teat insertion aperture merging into the retaining edge. The wall of the head member is stiffened in a region located between the teat insertion aperture and the transition to the retaining edge, and the upper end of the suction stub merges into this stiffened part of the head member. The part of the teat rubber cup head located between the stiffened part and the retaining edge is made at least partly elastic. During the suction phase a compressive force acts on the section of the head member located between the stiffened part of the head member and the retaining edge, the force endeavouring to move that section towards the outside of the suction stub. An upward movement of the teat cup sleeve then takes place, while in the relief phase a slight downward movement of the sleeve takes place relative to the teat.

26 Claims, 9 Drawing Sheets

TEAT RUBBER CUP

Figure 1:
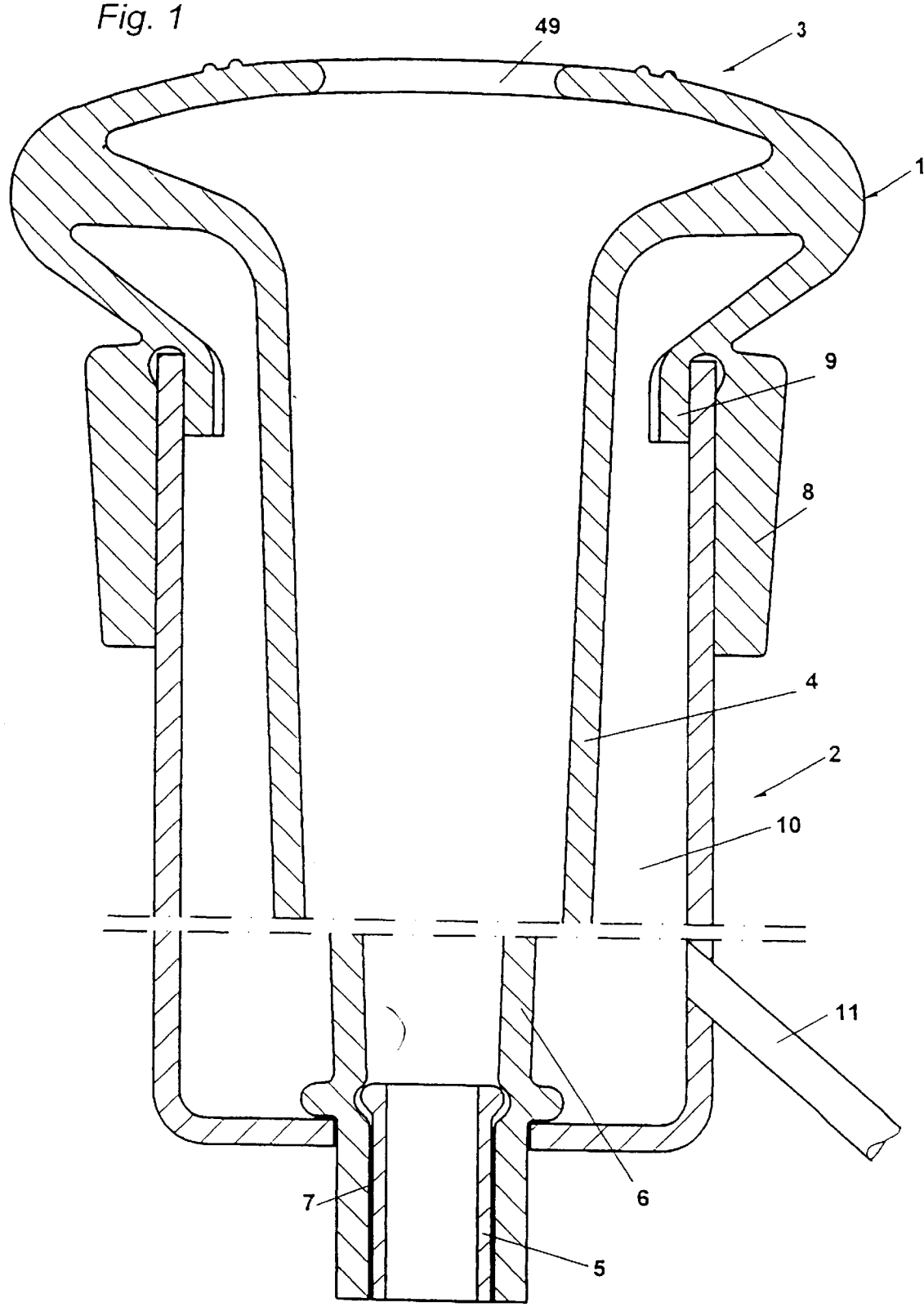

The invention relates to a teat rubber cup comprising a head member substantially rotationally symmetric with a longitudinal axis, with an aperture for insertion of the teat, a retailing edge to engage over a teat cup sleeve, and a suction stub joined to the head member.

A teat rubber cup is known from U.S. Pat. No. 2,744,496 in which a substantially rotationally symmetric head member is provided, having an insertion aperture for the teat at its upper end and merging into a so-called suction stub at its lower end. A retaining edge to engage over a teat cup sleeve is moulded onto the outside at the transition between the head member and the suction stub.

A teat rubber cup was already known from U.S. Pat. No. 4,141,319, having a considerably stiffened retaining edge which both engages over the teat cup sleeve on the outside and projects beyond the edge of the sleeve in a longitudinal direction at a certain spacing. An annular sealing lip extends radially inwardly at the axially remote end of the retaining edge, the lip having an aperture for insertion of the teat on the common longitudinal axis. The end of the suction stub towards the teat insertion aperture leads into the underside of the sealing lip, at a spacing from the transition between the lip and the retaining edge. The construction of the teat rubber cup causes the diameter of the teat insertion aperture, formed by the sealing lip, to be extended in the suction phase.

A teat rubber cup is already known from DE 29 41 150, in which the head member is substantially in the form of a torus which has a teat insertion aperture located on the axis of rotation on its upper side and which merges into the suction stub at its opposite side. A retaining edge to engage over the teat cup sleeve is moulded onto the outside at the level where the head member merges into the suction stub. The diameter of the teat cup sleeve in this teat rubber cup is relatively large. On the other hand there is a great danger that the retaining edge may break comparatively easily if the teat cup is impacted or knocked.

A teat rubber cup is also already known from EP 0 477 950, in which the head member is substantially in the approximate form of a torus, at one end of which a teat insertion aperture located on the axis of rotation is formed. The opposite end of the head member merges directly into the top end of the suction stub. A retaining edge to engage over the teat cup sleeve is formed at the level where the head member merges into the suction stub. A ring may further be placed on the upper edge of the teat cup sleeve and come to rest in an appropriate recess in the retaining edge. This ring prevents the retaining edge from breaking should the teat cup accidentally hit an obstruction.

The problem of the invention is to provide a teat rubber cup better adapted to the physiology of the animal to be milked.

The problem is solved by a rubber teat of the above type which is distinctive in that the end of the head member opposite the teat insertion aperture merges into the retaining edge, that the wall of the head member is stiffened in the region of maximum outside diameter, relative to the adjoining regions, that the end of the suction stub towards the teat insertion aperture merges into the head member at the level of the stiffened region, that at least a portion of the part of the head member located between the stiffened region and the transition to the retaining edge is elastically deformable relative to the stiffened region, and that this part of the head member and the end of the suction stub towards the teat insertion aperture together bound a cavity between them. A teat rubber cup of this type has the advantage of rising and falling in the longitudinal direction of the teat in the course of the successive suction and relief phases, leading to relaxation of the udder muscles. At the same time a slight, downwardly directed pull is exerted on the teat when the externally located teat cup sleeve is raised relative to the internally located suction stub, which bears against the lower end of the teat. If the four teat cups are placed on the teats for milking and pairs are in each case operated in phase opposition to the pulsed timing, this has the result that pairs of teat cups which are switched into the suction phase easily move upwardly towards the teat, while the two other cups which are switched into the relief phase easily move downwardly relative to the longitudinal direction of the teat. Hence a slight swinging motion can be produced at the udder when switching over in pulsed timing, leading to further relaxation, particularly easing of tension, and helping to increase the total milk yield.

The teat rubber cup may particularly be constructed so that the wall section located between the transition to the retaining edge and the stiffened region of the head member is in the form of a wall section continuously enlarging radially outwardly and upwardly and towards the stiffened region.

A construction in which the wall section located between the transition to the retaining edge and the stiffened region of the head member extends substantially radially outwardly is particularly appropriate. A construction of this type may also be used to protect the retaining edge from breaking at the level of the top edge of the teat cup sleeve.

A construction where the wall thickness of the suction stub increases before its transition to the stiffened region of the head member is also particularly appropriate. It has the effect that the stiffened region of the head member, virtually together with the top end of the suction stub, forms a region which is totally stiffened in itself, so that in the suction phase substantially only the wall region of the head member located between the stiffened region and the transition to the retaining edge moves towards the top end of the suction stub.

Such stiffening of the top end of the suction stub may be obtained e.g. by making the wall thickness of the suction stub increase continuously to the transition with the stiffened region of the head member, or alternatively by giving the top end of the suction stub uniform stiffening over a certain region.

On the other hand the aim of reducing the cavity located between the top end of the suction stub and the lower wall section of the head member facing towards the retaining edge in the suction phase, or in an extreme case of bringing the wall sections bounding the cavity into contact, may be achieved in several preferred ways. For example the whole lower wall section may be made of an elastic material, if appropriate a less thick one, so that the wall section can be compressed towards the wall, e.g. with a corresponding compressive force, or the wall can bulge inwardly towards the suction stub. Alternatively the wall section could be made of a relatively stiff material, provided that an elastic region, which can virtually act as a kind of movable hinge between the adjoining lever arms, is formed merely at the transition between that wall section and the stiffened region of the head and/or at the transition between that wall section and the retaining edge. An elastic region of this type may be obtained e.g. by means of a constriction, i.e. a reduction in wall thickness. In another possible embodiment the wall region may be a totally elastic region, and in the form of outwardly curved rolling bellows. Another possible construction of the wall of this section of the head member is to have the wall in the form of spring bellows. In that case the whole wall region may be elastic, although in another version the individual bellows sections may be relatively stiff and merely interconnected elastically in their joining or direction-changing regions.

The head member may be stiffened e.g. by enlarging the volume in that region, or e.g. by casting a ring made of another stiff material into that region of the rubber teat. Another means of stiffening it may be to insert a ring in the cavity between the top end of the suction stub and the lower end of the head member, the ring lying against the inside of the head member in that region and counteracting any reduction in the outside diameter of the head member in that region. The head member may alternatively be stiffened by appropriate shaping, e.g. by making it in the form of a cylindrical wall of constant diameter in that region.

To ensure that, following the collapse of the cavity located between the top end of the suction stub and the lower wall region of the head member, the wall regions brought into contact with each other are still held together in the relief phase, ribs or recesses are preferably provided on one or possibly both of the opposing surfaces, by means of which the vacuum between the walls in contact with each other can be removed in the relief phase.

To improve the retention of the rubber teat on the teat cup sleeve, a ring which can be placed on the upper edge of the sleeve may be provided, the ring having an edge extending substantially longitudinally of the sleeve and being offset radially outwardly towards the outside wall of the sleeve. In that case an annular recess is preferably formed in the retaining edge of the rubber teat, into which recess the edge of the ring can be inserted, so that the retaining edge of the teat engages over the edge internally and externally. The ring may alternatively be constructed so that it has a second edge, which extends substantially longitudinally of the teat cup sleeve and which is offset radially inwardly towards the suction stub. In that case the rubber teat may preferably be constructed so that an annular section of its retaining edge is brought into engagement in an annular recess formed between the first and second edges of the ring. In such an embodiment the above-mentioned wall sections of the rubber teat can very well be prevented from clinging together on transition from the suction to the relief phase, if ribs or recesses extending substantially in an axial direction are provided on the inner wall of the second edge facing towards the suction stub.

The ring itself may be made of a material which is more elastic than that of the teat cup sleeve but harder than that of the teat rubber.

In another embodiment of the invention a fixing edge engaging over the second edge of the ring may be provided on the outside of the suction stub, and the wall of the part of the suction stub located between the stiffened region of the head member and the fixing edge, aid the wall of the part of the head member located between the stiffened region of the head member and the transition to the retaining edge are in the form of rolling bellows and/or spring bellows; a connection is further provided between the cavity defined thereby and the pulse chamber located between the outside of the suction stub and the inside of the teat cup sleeve.

Figure 2:
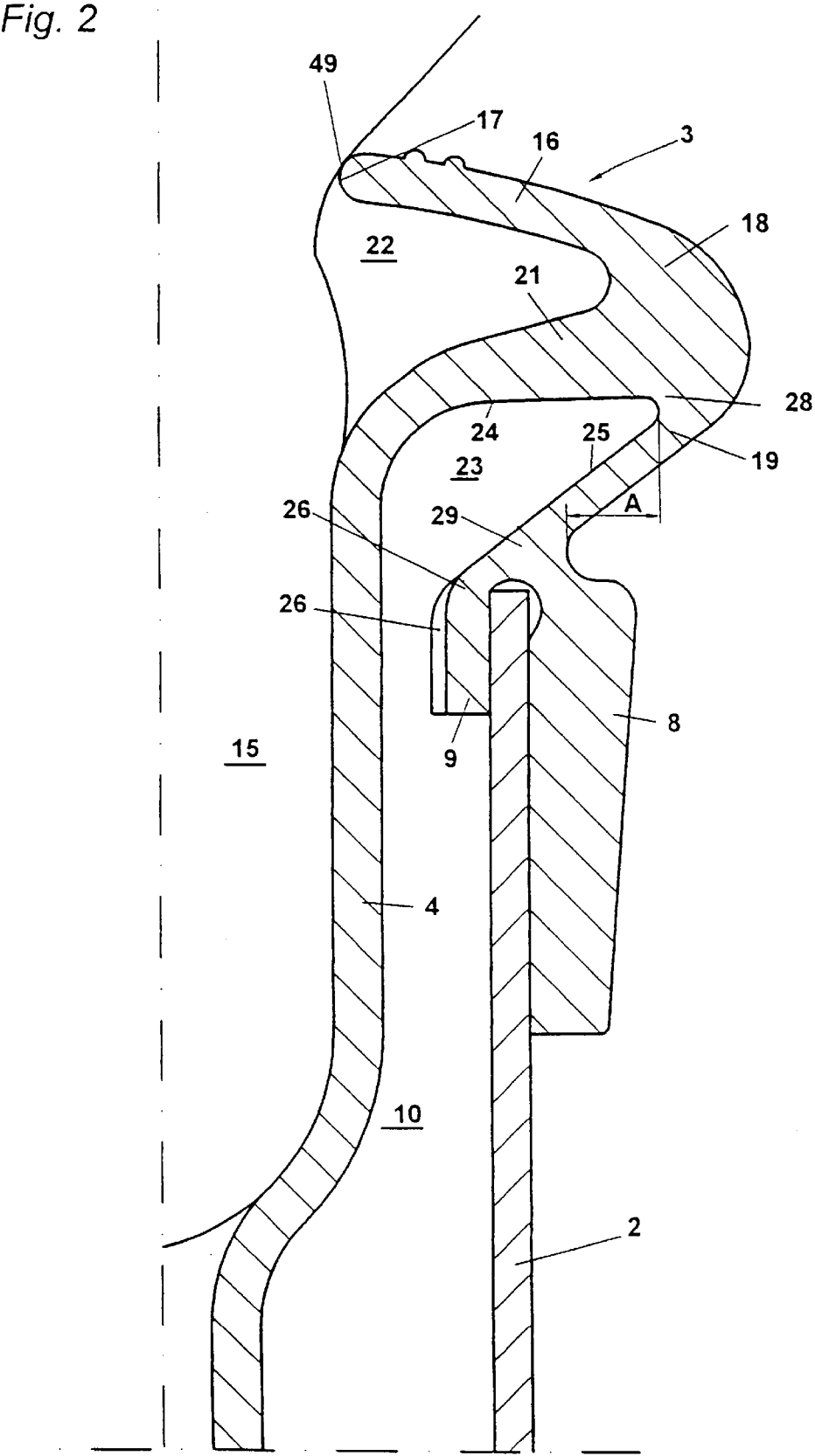
Figure 3:
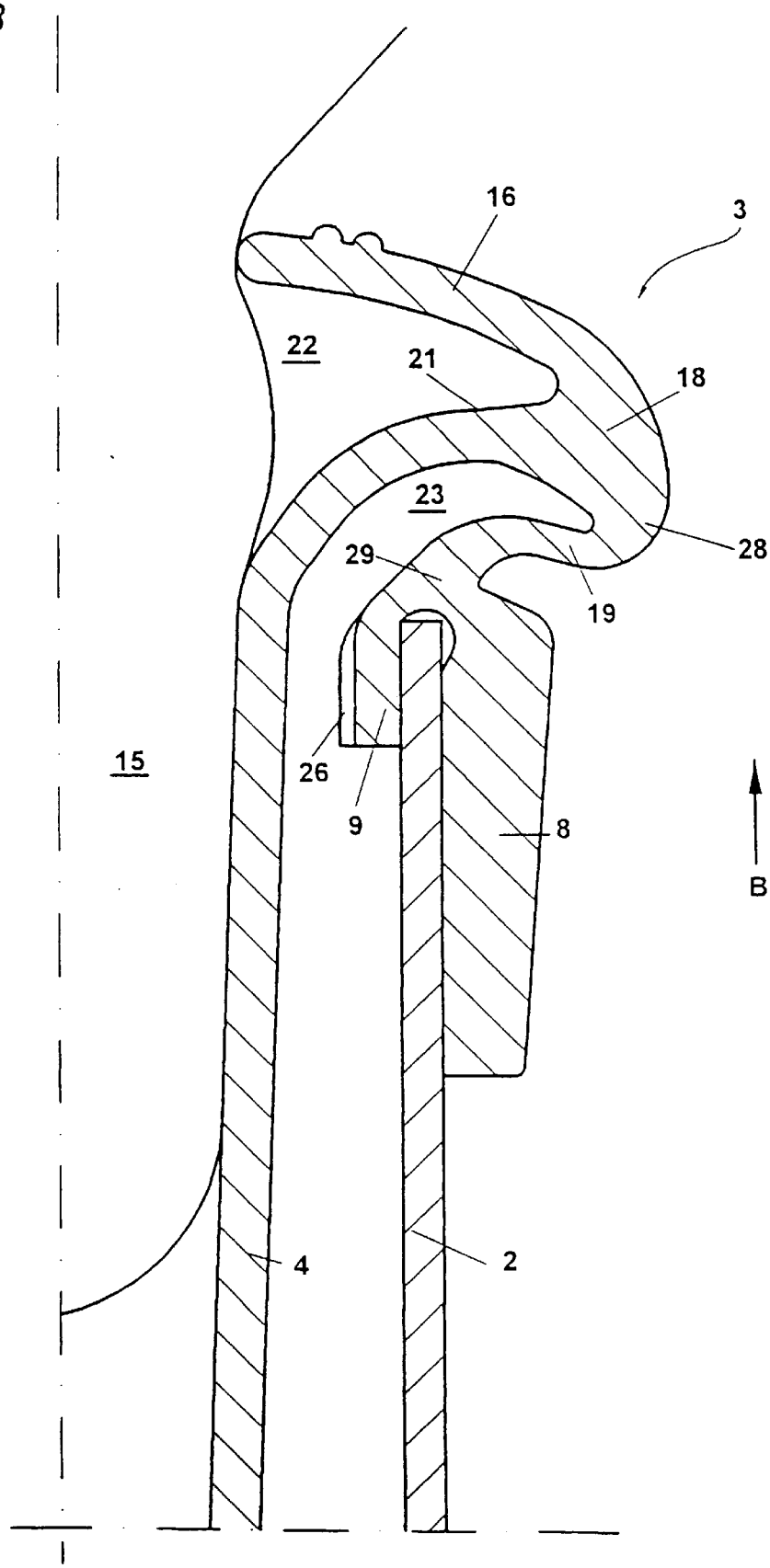
Figure 4:
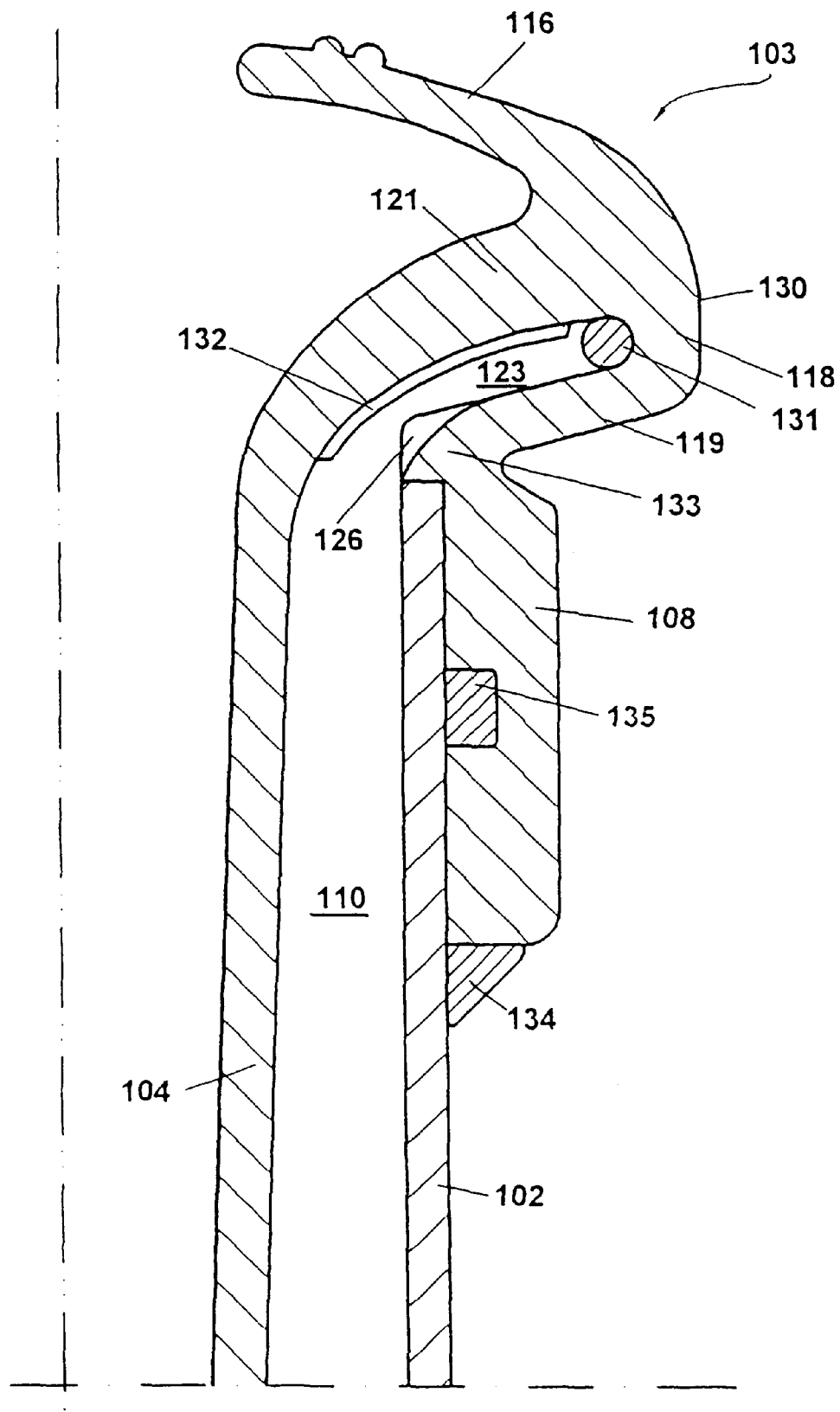
Figure 5:
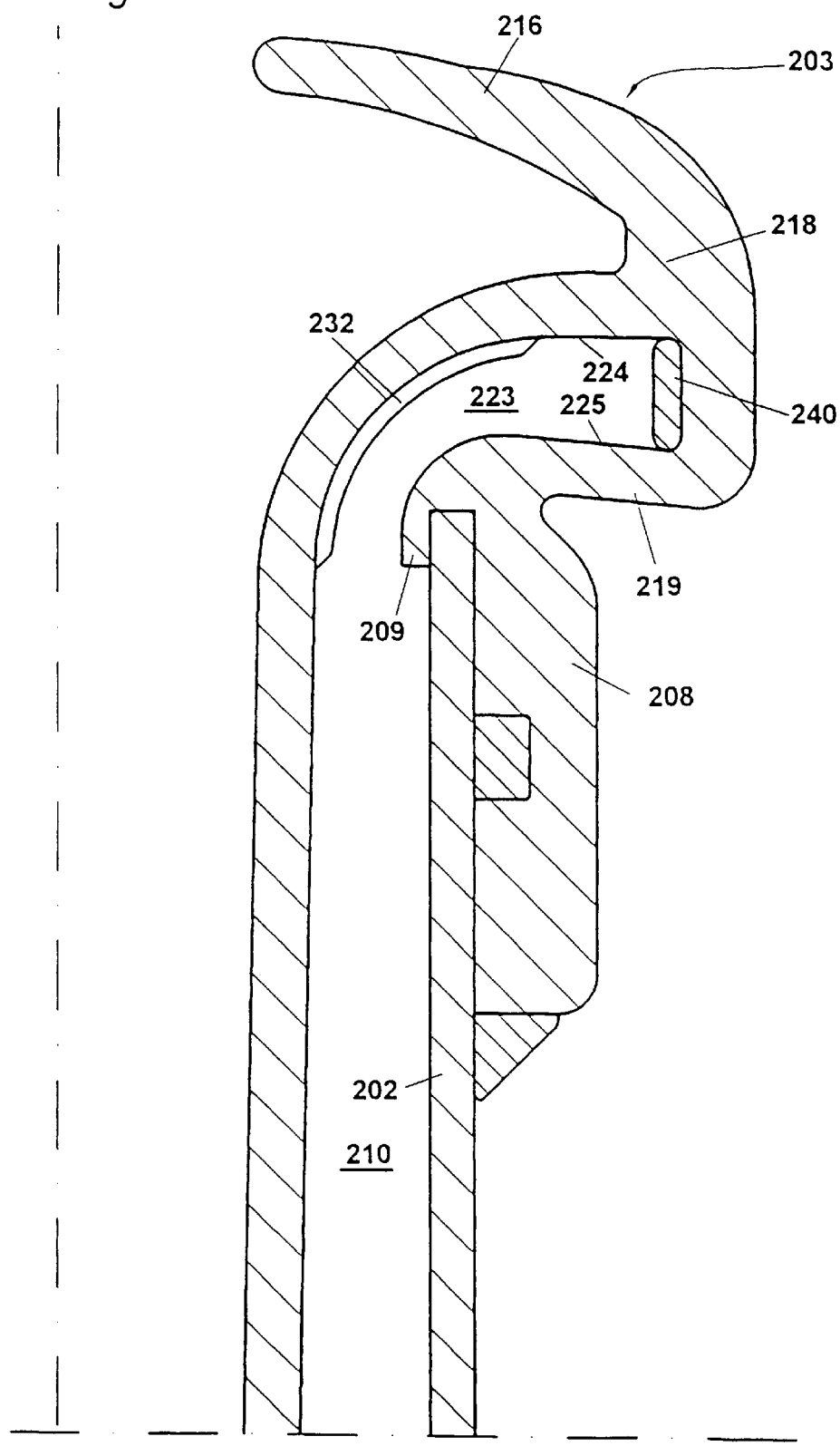
Figure 6:
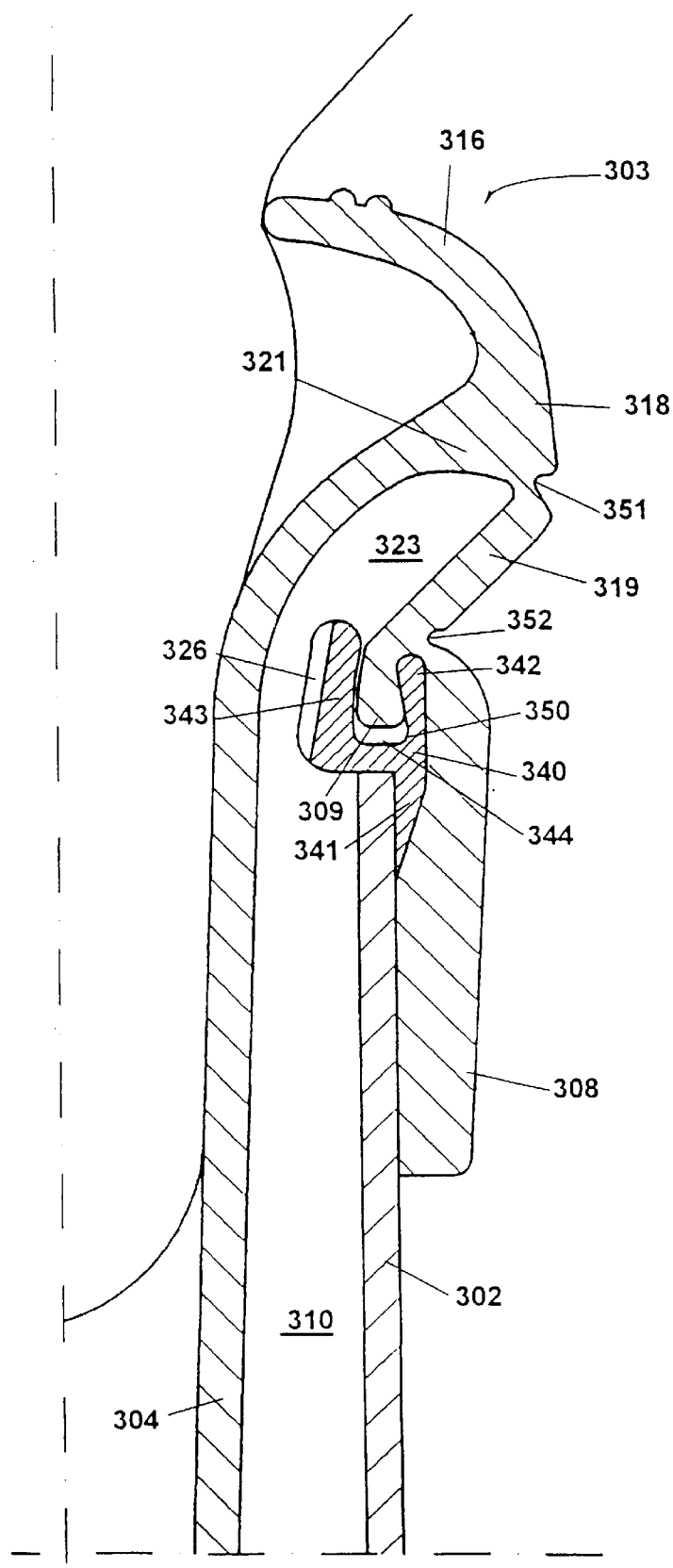
Figure 7:
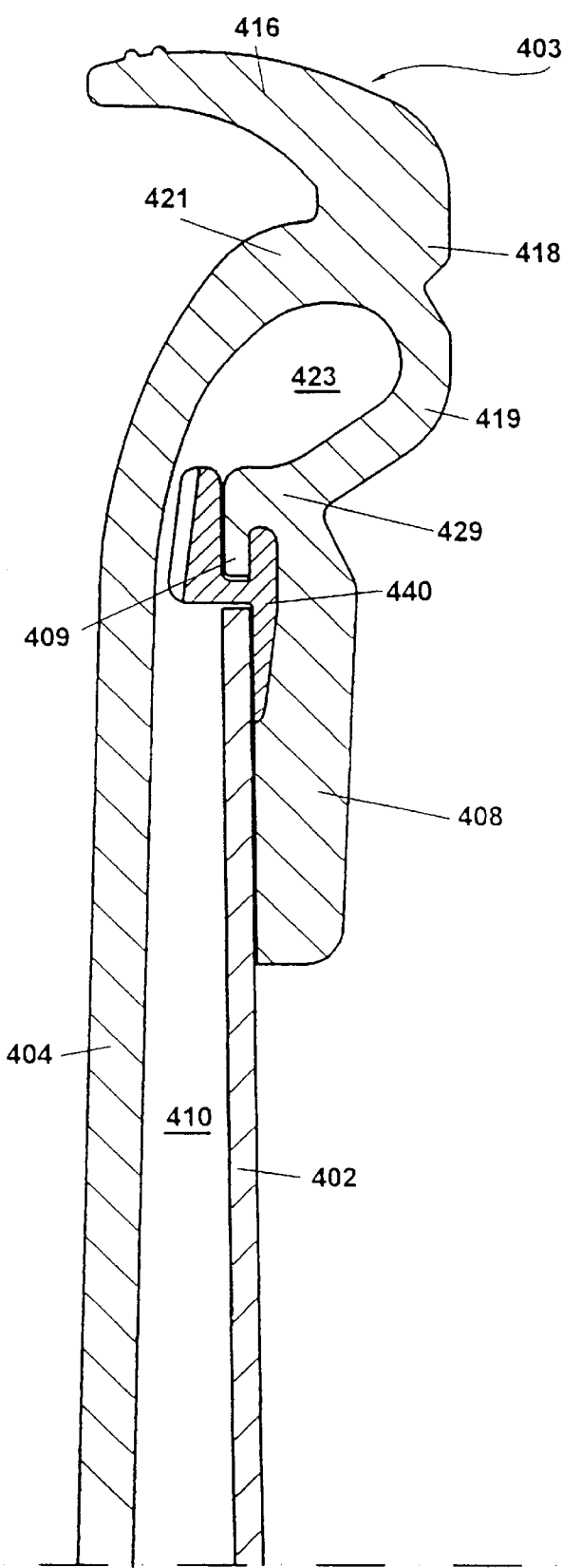
Figure 8:
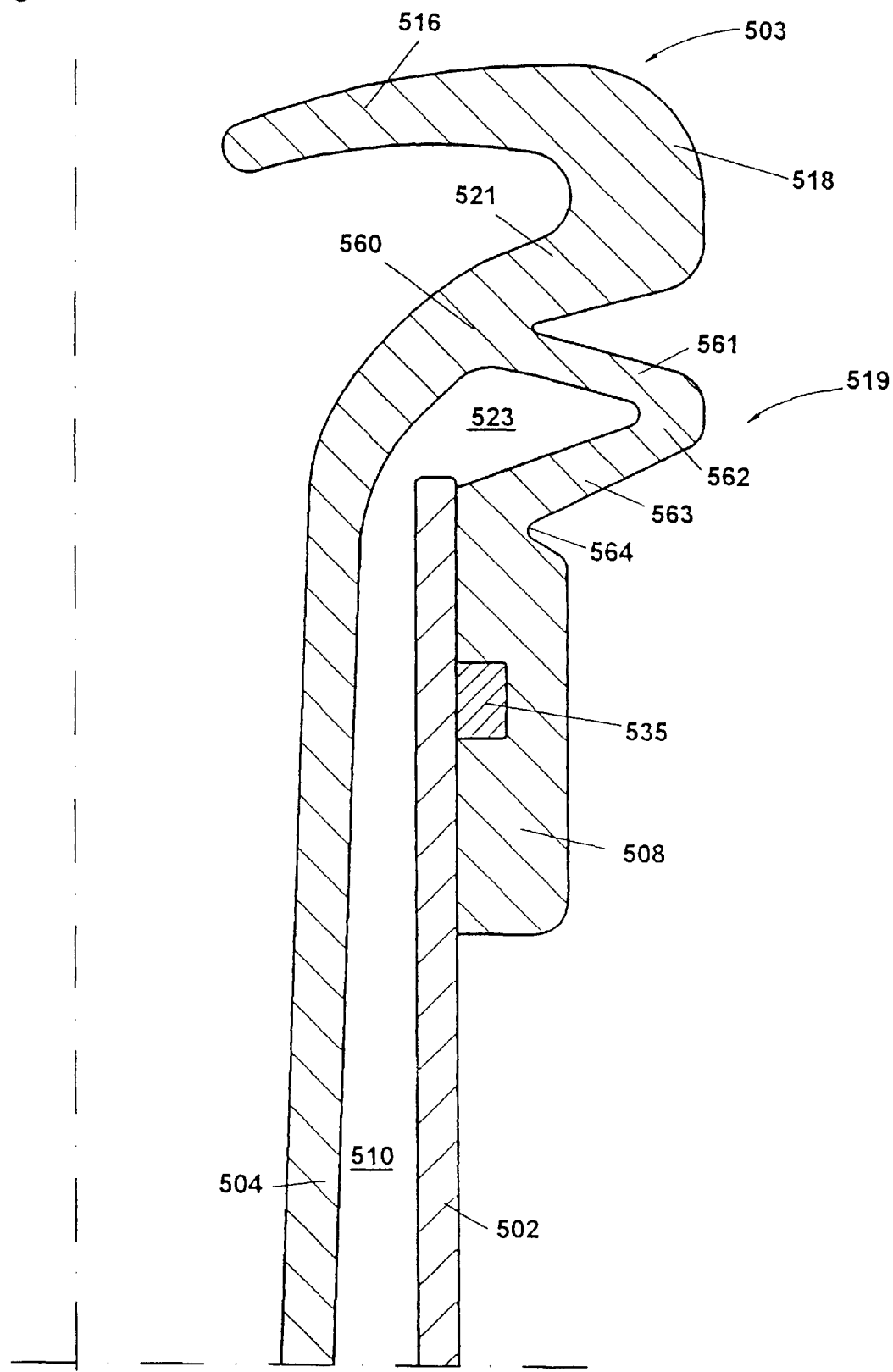
Figure 9:
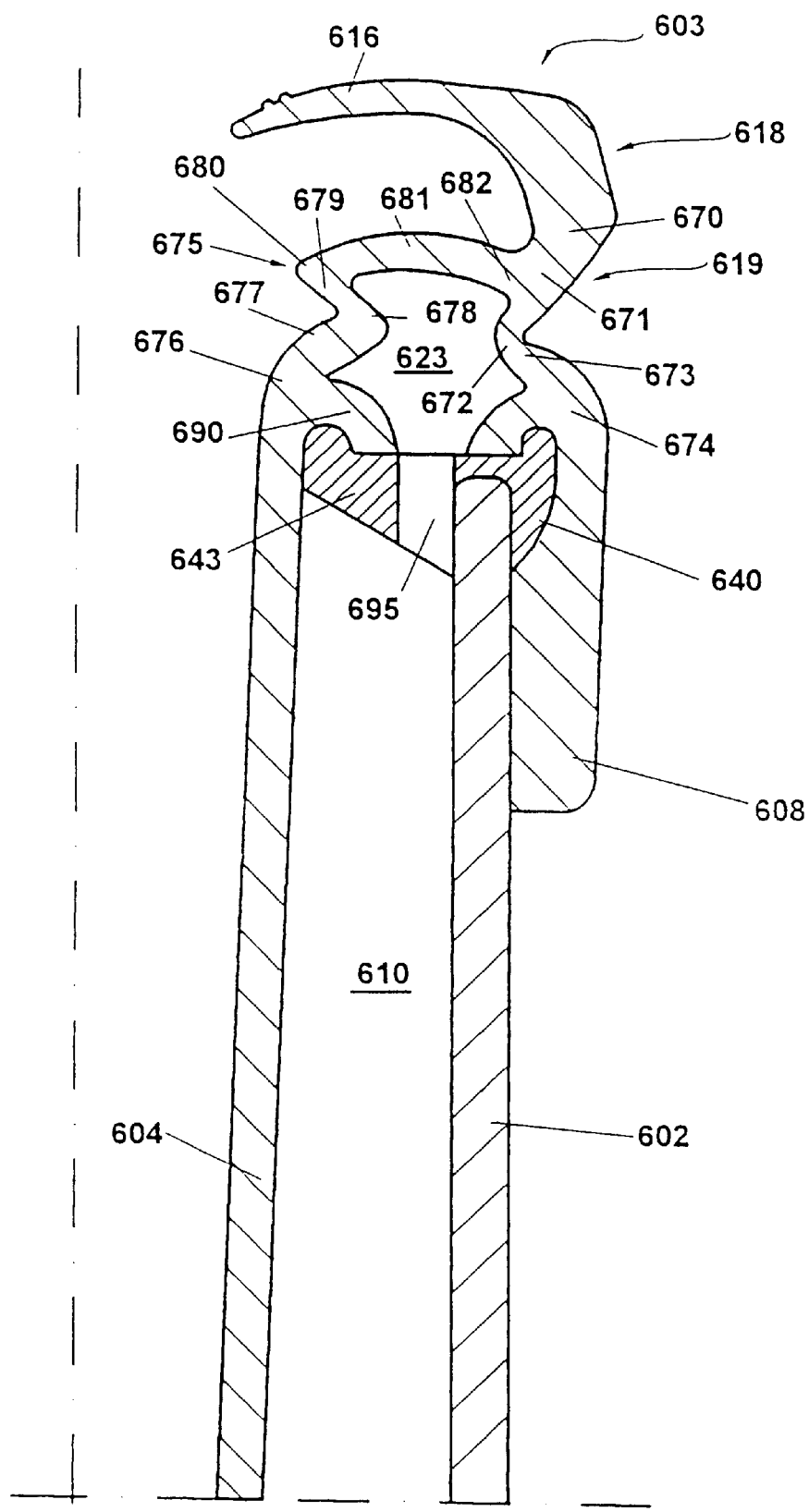

The invention will now be explained in greater detail with reference to preferred embodiments shown in the drawings. In these:

FIG. 1 is a longitudinal section through a rubber teat constructed according to the invention, which is inserted in and fixed to a teat cup sleeve, FIG. 2 is a larger-scale fragment from the longitudinal section in FIG. 1, shown in the relief phase, FIG. 3 is the same view as in FIG. 2 but in the suction phase, FIG. 4 is a view similar to FIG. 2 of a different embodiment of a teat rubber cup constructed according to the invention, FIG. 5 is a view similar to FIG. 2 of a further embodiment of a teat rubber cup constructed according to the invention, FIG. 6 is a view similar to FIG. 2 of a further embodiment of a teat rubber cup constructed according to the invention, FIG. 7 is a view similar to FIG. 2 of a further embodiment of a teat rubber cup constructed according to the invention, FIG. 8 is a view similar to FIG. 2 of a further embodiment of a teat rubber cup constructed according to the invention, and FIG. 9 is a view similar to FIG. 2 of a further embodiment of a teat rubber cup constructed according to the invention.

Referring to FIG. 1, this shows a teat rubber cup 1 constructed according to the invention and combined with a teat cup sleeve 2 to form a so-called teat cup unit. The teat rubber cup substantially comprises an upper, head member 3, and a suction stub 4 which is joined to the head member at its upper end and clamped into a bottom aperture 7 of the sleeve 2 by means of a connecting stub 5 at its lower end 6. This retaining means is known and commonly used. Other retaining means are known, in which beads are formed on the outside of the suction stub, into which beads the edge of the sleeve aperture is placed. The teat rubber cup 1 further comprises a retaining edge 8, enabling it to engage over the upper end of the teat cup 2. It then lies against the outside of the teat clip. Part of the retaining edge shown at 9 may be applied to the inside of the teat cup sleeve for additional support, as illustrated in this example. The upper end of the teat rubber cup contains an aperture 9 through which the teat of the animal to be milked is inserted. A so-called pulse chamber 10 is formed between the inside of the teat cup sleeve 2 and the outside of the suction stub 4. It is connected by a stub 11 to a pulsator known per se, which alternately produces a vacuum and atmospheric pressure in the chamber 10 during operation. The teat rubber cup itself is normally rotationally symmetric with its longitudinal axis. However triangular, tetragonal, elliptical or ribbed cross-sections for the suction stub are also known.

FIG. 2 shows the part of the teat rubber cup in the top right-hand corner of FIG. 1 and the upper part of the teat cup sleeve, on a larger scale. A teat 15, inserted from above through the aperture 9 into the interior of the head 3 and the interior of the suction stub, is also shown diagrammatically. The outside of the head member is comparable with a torus shape, although this shape is not obligatory, as will be seen in detail from the embodiments in FIGS. 4 to 6. The head substantially comprises an upper lip section 16, forming a sealing lip 17 which surrounds the aperture 9 and is applied to the upper part of the teat 15. The sealing lip 16 merges into a stiffened region 18 at the point where the outside of the head 3 has its maximum diameter. In this example the stiffening is obtained by making the wall considerably thicker in that region. The stiffened region 18 is adjoined in a downward direction by another region 19 which will be described in detail at a later stage. The region 19 merges into the retaining edge 8 and 9 approximately in the region of the constriction 20. The upper end 21 of the suction stub 4 leads to the stiffened section 18 of the teat rubber cup head 3. The wall thickness of the upper end 21 preferably increases itself before reaching the stiffened part of the teat rubber cup. The upper end of the suction stub thereby has a certain stiffening compared to the lower part, which normally has uniform thickness. The part of the stub with uniform wall thickness is applied to the lower periphery of the teat 15.

Substantially two cavities are formed in the head member 3, namely a first cavity 22 between the inside of the sealing lip 16 and the inside of the upper end of the suction stub 4. A second cavity 23 is part of the pulse chamber 10 and forms the upper end thereof, the chamber 10 is bounded by the outside 24 of the upper end of the suction stub 4 and the inside 25 of the lower part 19 of the head member.

Ribs 26 extending in an axial direction are formed on the inner part 9 of the retaining edge, at the side facing towards the outside of the suction stub 4. They allow air to pass into the chamber 23 when the outside of the suction stub 4 is applied to the inside of the part 9. Grooves may be provided instead of the ribs 26, also extending in an axial direction and fulfilling the same purpose. The ribs or grooves need not run in an exactly axial direction if they merely fulfil the purpose of allowing pressure equalisation between the lower pulse chamber 10 and the chamber 23, for example by introducing gas, if the outside of the suction stub should be applied to the inside of the retaining edge 9 when operating under vacuum.

In this embodiment the lower section 19 of the head member 3, located approximately between the lower end 28 of the stiffened portion 18 and the transition 29 to the retaining edge, is in the form of a resiliently deformable section. This effect may be obtained e.g. by making the thickness of the wall of the section 19 correspondingly thin, particularly compared to the stiffened parts 18 and 21.

It has been found that the in-folding pressure of a suction stub depends not only on the choice of material and the strength of the wall but also on the conicity of the upper part of the stub and the prestressing with which the stub is held at its lower end after being clamped in.

The mode of operation of the rubber teat is substantially as follows.

During the milking process, in which a milking vacuum is applied inside the suction stub and thus below the lower end of the teat 15, the chamber 22 in the upper part of the head member is almost under vacuum. The pressure in the chamber 22 is virtually unchanging during the milking operation.

In modern milking it is normal to operate in pulsed mode. That is to say, in a so-called suction phase in which milk is sucked out of the teat 15 by the vacuum applied below the teat, the pulse chamber 10 is also under a corresponding vacuum through the pipe 11. The stub thereby takes on the cylindrical shape shown in FIG. 1. In the relief phase which follows, a vacuum continues to be maintained inside the suction stub, while the pressure in the pulse chamber 10 is raised usually to atmospheric pressure. The suction stub is thereby compressed flat below the teat owing to the different pressures acting on both sides of the stub, so that no more milk can be sucked out of the teat. The tip of the teat is thereby massaged simultaneously.

The condition in the relief phase is shown first in FIG. 2. In this condition atmospheric pressure prevails in the pulse chamber 10 and thus also in the chamber 23. That is to say, the pressure on the opposing sides of the wall section 19 is equal. On the other hand there is an approximate vacuum at the opposing sides of the upper end 21 of the suction stub in the chamber 22, and atmospheric pressure in the chamber 23. A force is thereby exerted although, owing to the stiffening 21 of the upper end of the stub, it virtually does not cause a change in the shape of that part of the stub, particularly as the adjoining end of the stub is in frictional contact with the outside of the teat. That is to say, merely a slight upward pull is exerted on the teat.

In the suction phase a negative pressure is produced in the pulse chamber 10 and thus in the chamber 23, while atmospheric pressure prevails on the outside of the teat rubber cup. Under these conditions the lower wall section 19 in the annular region A has atmospheric pressure outside it and vacuum inside it. The section 19 is thereby deformed upwardly as shown in FIG. 3. That is to say, the inside of the wall section 19 endeavours to lie against the outside of the upper, stiffened end 21 of the suction stub. The volume of the cavity 23 is thereby considerably reduced. By this process a force in the direction of the arrow B, i.e. an upwardly directed force, is exerted o, the teat cup sleeve, slightly raising the sleeve, with the retaining edge 8 and 9 applied to it, relative to the stub 4. On the other hand a corresponding, downwardly directed opposing force is exerted on the suction stub. As the stub is in contact with the outside of the lower part of the teat 15, this force is transmitted to the teat. That is to say, altogether a downwardly directed force is exerted on the teat.

FIG. 4 shows an embodiment of a rubber teat similar to that in FIGS. 1 to 3. Identical parts therefore carry the same references increased by 100. In this embodiment the head member 103 is not shaped as a torus; instead it has a section 130 of constant outside diameter, which is cylindrical virtually in an axial direction, at the level of its maximum outside diameter. The lower section of the part 119 of the head is not at an angle of between about 20 and 45° to the horizontal as in the FIG. 2 embodiment, where the teat rubber cup is in the relaxed state; in this arrangement the angle between the horizontal and the alignment of the part 119 of the wall is relatively small, i.e. within the range from 5 to 10°. It should however be mentioned that the angle to the horizontal may be reduced to zero and may even go further to angles below 0°. Such an angular position is possible with an appropriately shaped teat rubber cup, as will be seen from FIG. 5 which will be explained below.

With this arrangement a ring 131 of circular cross-section is inserted in the cavity 123, in such a way that it lies against the inside of the part 118 of the head. The ring can provide considerable additional stiffening of the region 118, without any appreciable thickening with additional teat rubber cup material being needed. In this way the outside diameter of the teat rubber cup head may be kept smaller than in the embodiment in FIGS. 2 and 3.

In addition to or instead of the ribs 126 shown in FIG. 4, ribs or recesses 132 may be provided on the outside of the upper end of the suction stub.

Compared to the FIG. 2 embodiment, the internal part 9 of the retaining edge is omitted. The teat rubber cup is now supported on the upper edge of the teat cup sleeve 102 toy means of a lug 133. This enables the diameter of the teat cup to be as small as possible, thus keeping down the weight. In order to keep the teat rubber cup securely on the teat cup sleeve nevertheless, either a supporting ring 134 may be provided, fitted to the outside of the cup sleeve and supporting the lower end of the retaining edge 108, or a different retaining ring 135 could be provided on the outer periphery of the cup sleeve and inserted in a corresponding recess inside the retaining edge 108. In this way the teat rubber cup can be firmly seated.

The mode of operation of the teat rubber cup shown in FIG. 4 is similar to that of the embodiment shown in FIGS. 2 and 3.

FIG. 5 shows a teat rubber cup similar to that in FIGS. 2 and 4, and like parts therefore carry like references plus 200. The difference between this teat and the FIG. 4 embodiment is substantially that a reinforcing ring in the form of a round strip 240 is inserted in the cavity 223. This enlarges the distance between the outer wall 224 of the upper end of the suction stub and the inner wall 225 of the lower section 219 of the head member. It thus becomes possible to shape the wall section 219 of the lower part of the head member so that the wall extends substantially radially. The mode of operation explained in connection with FIGS. 2 and 3 is not changed by this feature. However this embodiment brings the important additional advantage that blows incurred when the rubber teat head accidentally impacts a resistance cannot now impact the retaining edge, lying over the upper end of the cup sleeve, and cause the edge to break; instead such blows are already absorbed and cushioned by the whole head member. The round strip 240 may be omitted if another appropriate type of stiffening is provided for the region 218.

FIG. 6 again shows another embodiment of a teat rubber substantially corresponding to that in FIG. 2, and like parts therefore carry like references plus 300. In this embodiment an additional ring 340 is placed on the upper edge of the teat cup sleeve. It has a retaining edge 341 lying against the outside of the sleeve. The ring also has a first edge 342 projecting beyond the upper end of the sleeve in an axial direction and offset radially outwardly from the outer wall of the sleeve. A second edge 343 likewise extends in a radial direction and is offset radially inwardly from the sleeve 302. The retaining edge 308 of the rubber teat engages over the first edge 342 and the retaining edge 341 of the ring 340, and continues over a certain part of the upper end of the teat cup sleeve 302, lying against its outer wall. The internal retaining edge 309 of the rubber teat projects into the annular gap 344 formed between the first and second edges and lies against the inside of the first edge 342. Ribs or grooves 326 extending in an axial direction are formed on the internal surface of the second edge 343, their purpose being to equalise the pressure in the cavity 323 during the relief phase as already explained above.

The ring 340 and particularly the first edge 342 may be made of a somewhat stiffer, i.e. less elastic material than the teat rubber cup, but of a soft material more elastic than the teat cup sleeve 302. In this way the ring 340 and particularly the first edge 342 can cushion any blows impacting the retaining edge of the teat rubber cup in the direction of the ring. The cushioning effect of the first edge 342 could be further enhanced by tapering the edge at its lower base, i.e. at about 350, thereby increasing its elasticity.

The lower wall section 319 of the head member 303 can fulfil its function even if it is not itself particularly elastic and is possibly stiff. In that case a constriction 351 which makes the part of the wall movable should be provided at the transition from the stiff portion 318 to the part 319 of the wall, and/or a corresponding constriction 352 should be provided at the transition from the wall region 319 to the retaining edge 308. The constrictions may then have elasticity such that the wall parts 318 and 319 and/or the wall parts 319 and the retaining edge 308 can move relative to each other like hinge joints. In this way the same mode of operation is obtained as was explained in connection with FIGS. 2 and 3.

Another embodiment of a teat rubber cup according to the invention is illustrated in FIG. 7, in which parts like those in the previous figures carry like references plus 400. No further mention will be made of the parts already described. The FIG. 7 embodiment differs from the others in that the part 419 of the head member located between the stiffened region 418 and the transition 429 with the retaining edge 408 is in the form of rolling bellows. This arrangement may, as shown, be in the form of an outwardly curved wall, made up completely or at least partly of an elastic wall section.

FIG. 8 shows another embodiment of a teat rubber cup according to the invention, in which like parts carry like references plus 500. Parts already mentioned will not therefore be elaborated on here. In this embodiment the part of the head section 519 located between the stiffened region 518 and the transition 564 with the retaining edge 508 is in the form of spring bellows, comprising the two bellows sections or bellows limbs 561 and 563. The upper end 560 of the spring bellows merges directly into the part 521 of the suction stub 504, which is already stiffened in that region. The lower part of the bellows merges into the transition 564 with the retaining edge 508. In this embodiment the two limbs 561 and 563 are joined by an outwardly bent connecting region 562. The whole wall region may have uniform or varying elasticity. However it is also possible to make the limbs 561 and 563 relatively stiff and only the connecting region 562 elastic, or also to make one or both of the connecting regions 560 and 564 elastic. The mode of operation of the teat rubber cup is the same as that of the teats described above.

The parts of the teat rubber cup shown in FIG. 9 which are of the same structure as those in the previous embodiments carry the same references plus 600, and no details will therefore be given of them. In this embodiment the stiffened region 618 of the head member 603 is joined to the retaining edge 608 by a part 619 which is in the form of spring bellows as shown in FIG. 8. But here the bellows have limbs 671 and 673 joined by an elastic region 672, and in contrast with FIG. 8 the elastic region is shown facing inwards. The upper end of the bellows merges into the stiffened region 618 at the point 670, and their lower end merges into the retaining edge 608 at the point 674. The structure of the spring bellows, in terms of both shape and choice of material in respect of elasticity, may be the same as that of the bellows shown in FIG. 8.

In the example shown in FIG. 9 the outside of the suction stub 604 has an annular attachment 690 forming a fixing edge, which engages over the second edge 643 of the ring 640 and thus fixes the stub to the edge 643 at the level of that edge. The end of the stub facing towards the teat insertion aperture, i.e. the part of the suction stub located between the fixing edge 690 and the stiffened region 618, is similarly in the form of spring bellows 675. The bellows so to speak have three limbs 677, 679 and 681, joined by the transition or articulation points 678 and 680. The bellows virtually merge into the lower part of the suction stub in the region 676 and with the stiffened part of the head member in the region 682. In these bellows too the whole wall region may be elastic; however some or all of the limbs may be stiffened, and the connection or transition regions joining the limbs should then be elastic.

The two spring bellows 619 and 675 bound the cavity 623. The cavity is joined to the rest of the pulse chamber 610 by a passage 695, e.g. in the form of a hole extending through the ring 640 in an axial direction.

The mode of operation of the rubber teat is as follows, starting from the position illustrated, representing the relief phase in which the pulse chamber 610 is at atmospheric pressure. In the production of a negative pressure in the pulse chamber during the suction phase the two spring joints 619, 675 are each contracted in an axial direction, so that the cavity 623 becomes smaller. In this way a periodic upwardly and downwardly directed force is again exerted on the outside of the teat in a longitudinal direction.

What is claimed is:

1. A rubber teat cup comprising a head member substantially rotationally symmetric with a longitudinal axis, with an aperture for insertion of the teat, a retaining edge to engage over a teat cup sleeve, and a suction stub joined to the head member, an end of the head member opposite the teat insertion aperture merging into the retaining edge, wherein a wall of the head member (3) is stiffened in a region (18) located between the teat insertion aperture (49) and a transition to the retaining edge (8), that the end of the suction stub (4) towards the teat insertion aperture (49) merges into the head member (3) at the level of the stiffened region (18), that at least a portion of a part (19) of the head member (3) located between the stiffened region (18) and the transition to the retaining edge (8, 9) is elastically deformable relative to the stiffened region (18), and that this part (19) of the head member (3) and the end of the suction stub (4) towards the teat insertion aperture together bound a cavity (23) between them.

2. A rubber teat cup according to claim 1, wherein the retaining edge (8, 9) of the rubber teat, when mounted on the teat cup sleeve (2), begins approximately at the level of the top edge of the sleeve and extends over part of the length of the outside of the sleeve.

3. A rubber teat cup according to claim 1, wherein the wall section (19) located between the transition to the retaining edge (8, 9) and the stiffened region (18) of the head member is in the form of a wall section (19) continuously enlarging radially outwardly and upwardly towards the stiffened region.

4. A rubber teat cup according to claim 1, wherein the wall section (219) located between the transition to the retaining edge (208, 209) and the stiffened region (218) of the head member (203) extends substantially radially outwards.

5. A rubber teat cup according to claim 1, wherein the wall thickness of the suction stub (4) increases before its transition to the stiffened region (18) of the head member (3).

6. A rubber teat cup according to claim 5, wherein the wall thickness becomes increasingly larger.

7. A rubber teat cup according to claim 1, wherein enlargement of the wall thickness of the suction stub (4) is provided, in the portion of the stub located approximately in the region between the radius corresponding to the inner wall of the teat cup sleeve (2) and the transition to the stiffened part (18) of the head member (3).

8. A rubber teat cup according to claim 1, wherein a constriction (352) is provided at the transition between the end of the head member (303) remote from the teat insertion aperture (49) and the retaining edge (8, 9) and ensures elastic deformation in the form of a bending joint.

9. A rubber teat cup according to claim 1, wherein a constriction (351) is provided at the transition between the stiffened part (318) of the head member (303) and the part (319) of the head member (303) towards retaining edge, and ensures elastic deformation in the form of a bending joint.

10. A rubber teat cup according to claim 1, wherein the stiffening in the head member region is produced by increasing the wall thickness of the head member.

11. A rubber teat cup according to claim 1, wherein the stiffening is provided in the region of the maximum outside diameter of the head member.

12. A rubber teat cup according to claim 1, wherein a ring running round the head member (3) is cast into the wall to stiffen the head member.

13. A rubber teat cup according to claim 1, wherein a ring (131, 240) lying against the inside of the head member is inserted in the cavity (123, 223) to stiffen the head member.

14. A rubber teat cup according to claim 1, wherein the stiffened region (118) is formed by a cylindrical wall section of constant outside diameter.

15. A rubber teat cup according to claim 1, wherein the part (419) of the head member located between the stiffened region (418) and the transition with the retaining edge (408) is in the form of outwardly curved rolling bellows.

16. A rubber teat cup according to claim 1, wherein the part (519) of the head member (503) located between the stiffened region (518) and the transition with the retaining edge (508) is in the form of spring bellows.

17. A rubber teat cup according to claim 1, wherein the part (519) of the head member located between the stiffened region (518) and the transition with the retaining edge (508) merges—at the end towards the stiffened region—into the stiffened end (521) of the suction stub (504) towards the teat insertion aperture.

18. A rubber teat cup according to claim 1, wherein substantially longitudinally extending ribs (26) and/or incisions are formed on at least one of the facing surfaces (24, 25) of the suction stub (4) or the inside of the head member (3, 19), or of the parts (9) of the retaining edge lying against the inside of the teat cup sleeve (2) for support.

19. A rubber teat cup according to claim 1, wherein recesses are provided inside the retaining edge (208), to engage over projections (135) formed on the outside of the teat cup sleeve (102).

20. A rubber teat cup according to claim 1, wherein a ring (340) which can be placed on the edge of the teat cup sleeve facing towards the head member (303) of the rubber teat is provided, the ring having an edge (342) extending substantially longitudinally of the teat cup sleeve and being offset radially outwardly towards the outside wall of the sleeve.

21. A rubber teat cup according to claim 20, wherein an annular recess is formed in the retaining edge of the rubber teat, into which recess the edge (342) of the ring (340) can be inserted, so that the retaining edge of the teat engages over the edge internally and externally.

22. A rubber teat cup according to claim 20, wherein the ring (340) has a second edge (343), which extends substantially longitudinally of the teat cup sleeve and which is offset radially inwardly towards the suction stub (3).

23. A rubber teat cup according to claim 22, wherein an annular recess (344) is formed between the first and second edges (342, 343) of the ring (340), with which an annular section (309) of the retaining edge of the rubber teat cupcan be brought into engagement.

24. A rubber teat cup according to claim 22, wherein ribs (326) or recesses extending substantially in a longitudinal direction are provided on the surface of the second edge (343) of the ring (340) facing radially inwardly.

25. A rubber teat cup according to claim 22, wherein fixing edge (690) engaging over the second edge (643) of the ring (640) is provided on the outside of the suction stub (604), that the wall of the part of the suction stub (604) located between the stiffened region (618) of the head member (603) and the fixing edge (690), and the wall of the part (619) of the head member located between the stiffened region (618) of the head member and the transition to the retaining edge (608) are in the form of rolling bellows and/or spring bellows, and that a connection (695) is provided between the cavity (623) defined thereby and the pulse chamber (610) located between the outside of the suction stub and the inside of the teat cup sleeve.

26. A rubber teat cup according to claim 25, wherein the connection is formed by at least one passage (695) in the ring (640), extending substantially in an axial direction.

* * * * *